FACSIMILE SCANNER

Filed Oct. 30, 1948 5 Sheets-Sheet 1

INVENTOR
Charles J. Young
BY
John O. Mitchell
ATTORNEY

INVENTOR
Charles J. Young
BY
John G. Mitchell
ATTORNEY

INVENTOR
Charles J. Young
BY
[signature]
ATTORNEY

Jan. 8, 1952 C. J. YOUNG 2,581,616

FACSIMILE SCANNER

Filed Oct. 30, 1948 5 Sheets-Sheet 4

INVENTOR
Charles J. Young
BY
Alfred O. Mitchell
ATTORNEY

Jan. 8, 1952

C. J. YOUNG 2,581,616

FACSIMILE SCANNER

Filed Oct. 30, 1948

5 Sheets-Sheet 5

INVENTOR
Charles J. Young
BY
[signature]
ATTORNEY

UNITED STATES PATENT OFFICE 2,581,616

FACSIMILE SCANNER

Charles J. Young, Princeton, N. J., assignor to Radio Corporation of America, a corporation of Delaware Application October 30, 1948, Serial No. 57,604

5 Claims. (Cl. 346—112)

The present invention relates to facsimile apparatus and more particularly, but not necessarily exclusively, to a novel scanner especially adapted for the reception of pictures, messages, and other subject matter in facsimile.

The scanner of the present invention which, in the illustrative example is shown as being adapted for recording, may readily be operated by non-technical personnel which makes it available for the reception of messages in facsimile as part of a commercially operated message service. Accordingly, the invention has the provision of a novel easily operated facsimile recorder for its principal aim.

Another aim or object is to provide a facsimile recorder which will accept a message sheet, for example a message blank, and place the message sheet in scanning position with the least amount of effort and attention on the part of an operator.

A further aim or object is to provide a facsimile scanner having novel means for the remote control of the position of a scanning point, such, for example, as a stylus, whereby the scanning point is movable from an inoperative to an operative position. A still further and related object is to provide a novel system for controlling the means for providing scanning traversal.

Still another object is to provide novel means for propelling an exploring point during a scanning operation in a facsimile scanner and for returning the exploring point to its initial position in preparation for a successive scanning.

In accordance with the invention, a scanner is provided which has a mechanism for forming a message sheet to a cylindrical configuration so that it may readily be traversed by a scanning point. The scanning point preferably rotates with respect to the sheet. In the illustrative example, this mechanism for coiling the sheet comprises a flexible web or curtain providing a flat surface on which a message sheet may be placed and thereafter the curtain is instrumental in forming a cylinder of the message sheet with the center portion thereof unobstructed and available for traversal in an orderly manner by an exploring point. The exploring point has two correlated degrees of movement so that line by line traversal of the unobstructed portion of the message sheet is obtained. In the illustrative example, a conductive exploring point in the form of a stylus is employed which traverses a conductive message sheet. The web or curtain of the illustrative arrangement, therefore, serves the additional function of providing a conductive platen.

Objects and advantages of the present invention in addition to those stated above will, of course, become apparent and immediately suggest themselves to those skilled in the art to which the invention is directed from a reading of the following specification in connection with the accompanying drawing in which.

Figure 1:
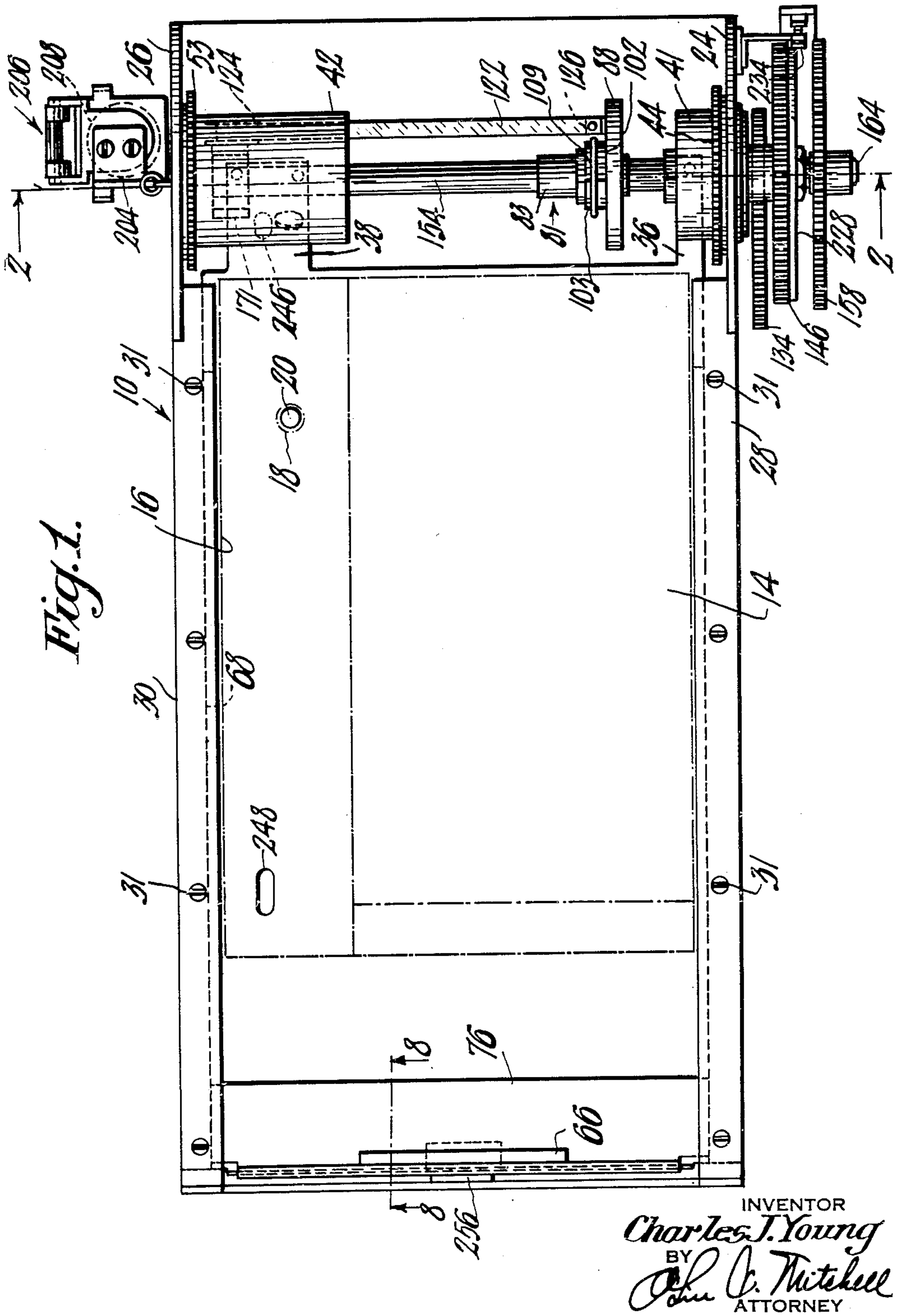
Fig. 1 is a top plan view of facsimile apparatus embodying the invention.

Referring to the drawing, facsimile apparatus in the form of a recording scanner embodying the invention is indicated in its entirety by reference character 10. This apparatus is in the form of a scanner for producing a record in facsimile of a piece of subject matter as will appear hereinafter. The initiation and termination of the production of the record are special features of the invention and will be discussed more in detail hereinafter. The scanner 10 is composed generally of a stationary part which includes a rigid substantially flat support 12 for supporting a flexible web or curtain 14 upon which a message sheet hereinafter termed a recording blank is placed initially. The curtain 14 may be made of phosphor bronze or beryllium copper. A message blank is shown illustratively in dot-dash outline in Fig. 1 of the drawing, and is indicated by reference character 16. This message blank is punched as indicated at 18 for cooperation with a locating pin 20 on the curtain 14. The punched hole 18 in the blank is preferably along the margin which usually bears printed indicia such as a "mast head" of a commercial message service. Mechanism, to be described in more detail hereinafter, provides a pulley structure upon which the curtain 14 carrying the recording blank is wound so that a sufficient amount of the area of the recording blank is exposed to the operation of an exploring point, such for example, a record recording stylus 22. Means are provided for traversing the stylus across the recording blank and for lifting the stylus out of contact with the recording blank and returning it to its initial position. After recording, the message blank is readily removed from the scanner 10 by drawing the curtain from the winding mechanism. The curtain is latched in its flat position but is readily releasable when another recording blank is to be brought into position for cooperation with the recording stylus.

Figure 2:
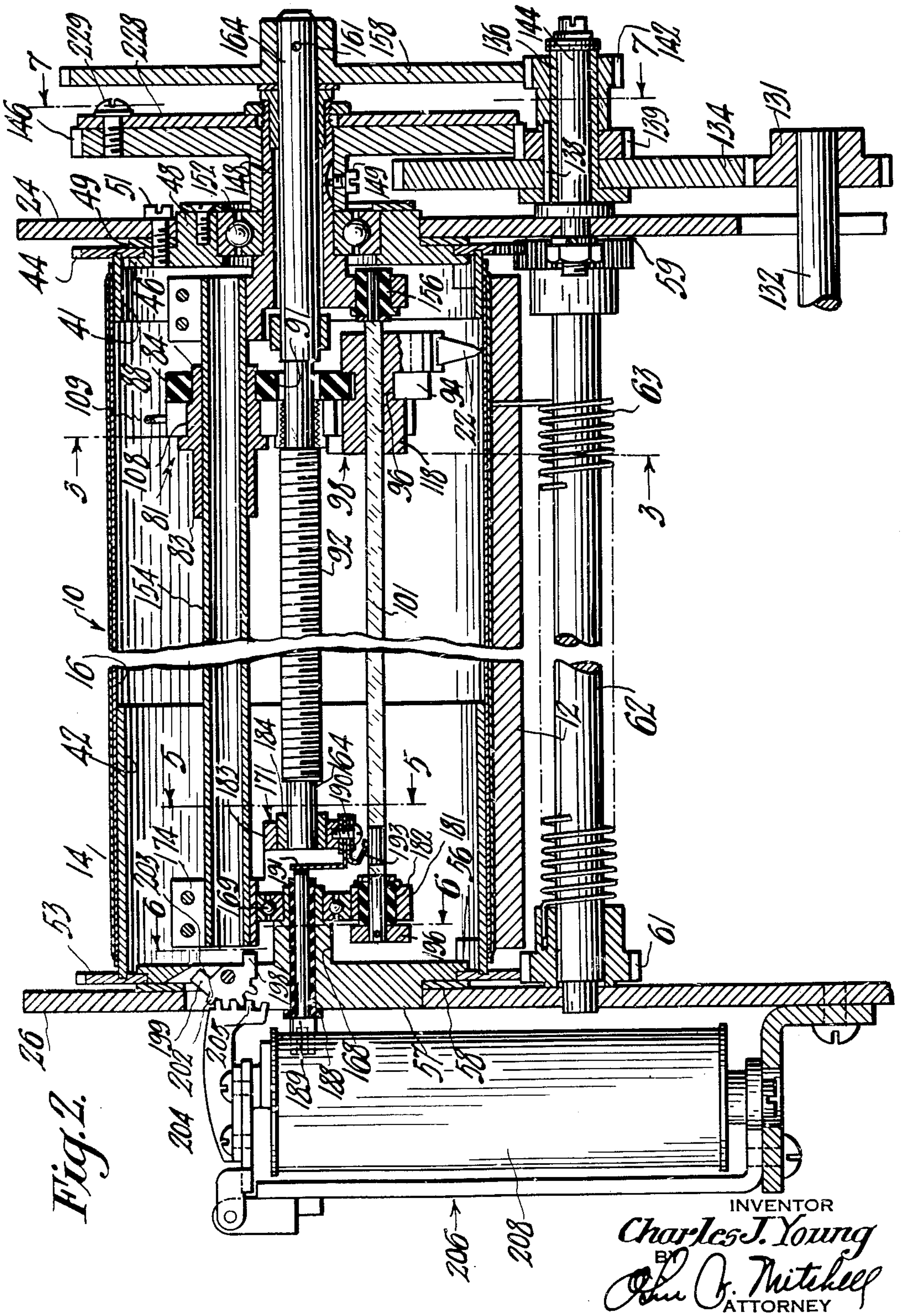
Fig. 2 is a vertical sectional view taken on line 2—2 of Fig. 1 as viewed in the direction of the arrows.
Figures 3, 4:
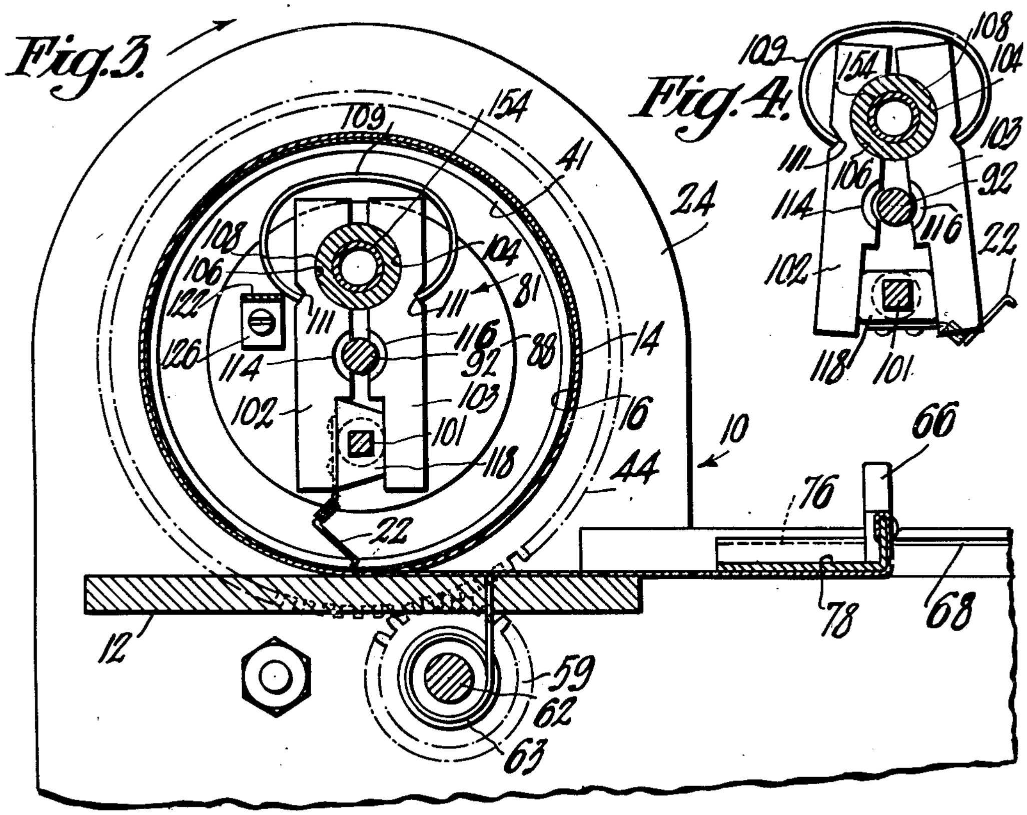
Fig. 3 is a vertical sectional view taken on line 3—3 of Fig. 2, certain of the parts of the apparatus being omitted for the sake of convenience of illustration.
Fig. 4 is a fragmentary vertical sectional view similar to Fig. 3 but with certain of the parts occupying a different position.
Figures 7, 8:
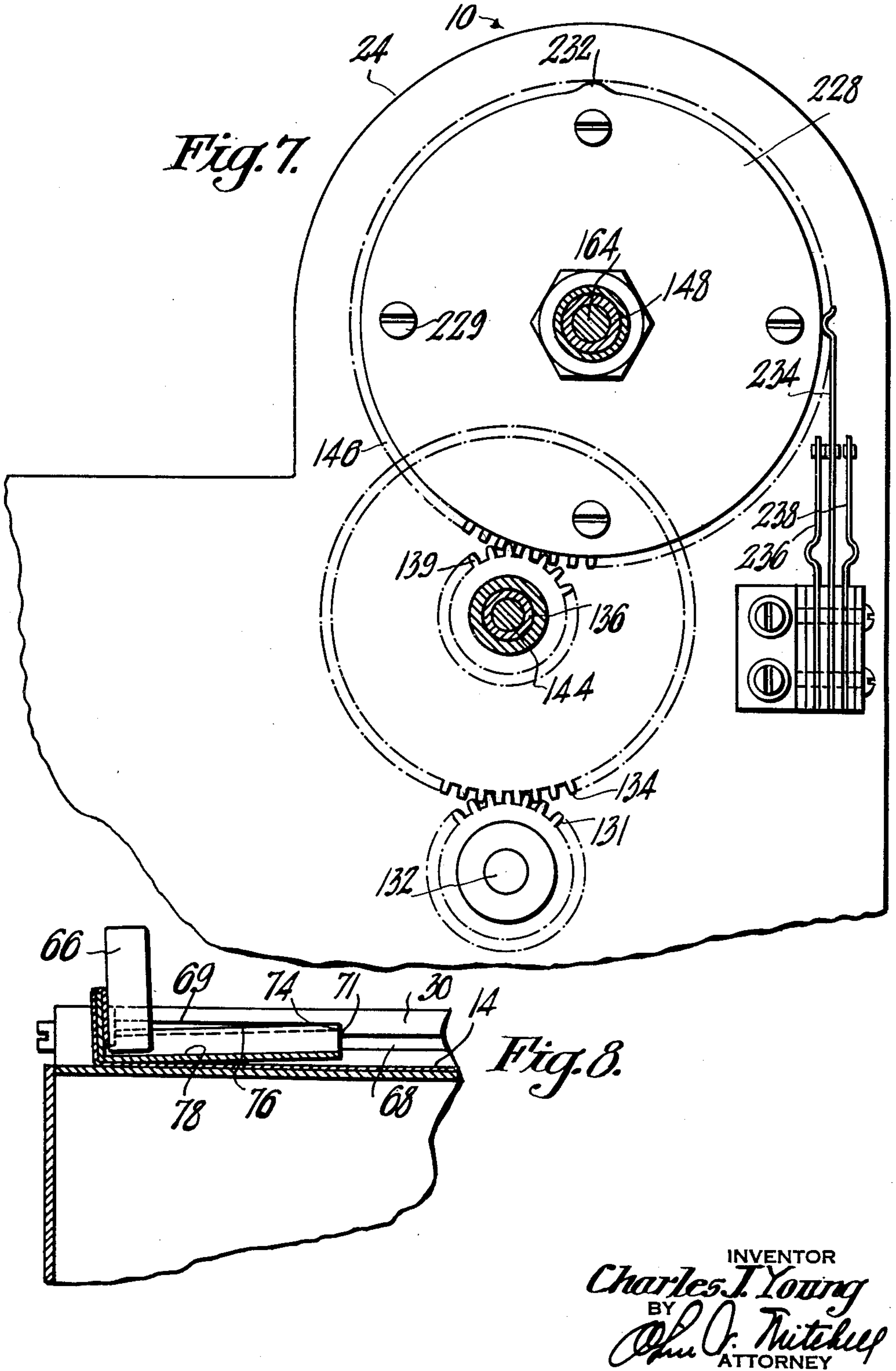
Fig. 7 is a fragmentary vertical sectional view taken on line 7—7 of Fig. 2.
Fig. 8 is a fragmentary vertical sectional view taken on line 8—8 of Fig. 1.

More in detail, the principal frame of the scanner 10 comprises two vertically disposed side plates 24 and 26, each having the configuration shown generally by Figs. 3 and 7 of the drawings. The previously mentioned flat support 12 is secured between these side plates so as to form a sufficiently rigid platform extending from the length of the scanning apparatus. A pair of side rails 28 and 30 are secured to the plate 12 by suitable means such as screws 31. The space between the side plates 24 and 26 and beneath the flat support 12 is available for the housing of electrical apparatus (not shown in detail). The previously mentioned curtain 14 is notched at one end to provide tabs 36 and 38 which are secured to sleeve members 41 and 42. As stated previously these sleeve members serve somewhat as pulleys upon which the curtain 14 is wound and the space between these sleeve members exposes a portion of the message blank to action of the recording device. As seen in Fig. 2, the sleeve member 41 is secured in any suitable manner as by solder to a gear 44. The gear 44 rides loosely in a groove formed between a flange 46 of a bearing bracket 48 and a spacing of filler washer 49. The bearing bracket 48 is clamped against the washer 49 which in turn is clamped against the frame member by a suitable fastening means such as screws 51. The sleeve 42 is secured in any suitable manner, such as by solder to a gear 53 which is substantially a counterpart of the gear 44. The gear 53 is rotatably held between a flange 56 formed on a second bearing bracket 57 and a filler washer 58. The bearing bracket 57 is clamped against the washer which, in turn, is clamped against the frame member 26 by one or more screws (not shown) which corresponds in function to the screws 51. The gears 44 and 53 are in meshing engagement with pinions 59 and 61 respectively which are secured to a shaft 62. The latter is suitably journalled as shown in the frame members 24 and 26. A torsion spring 63 is anchored in the base member 12 at one end, the one end being secured to the pinion 61. The spring 63 applies a turning force acting in a clockwise direction on the sleeves 41 and 42 as viewed in Fig. 3 of the drawings. From the arrangement of parts, so far described including the gears 44 and 53, it will be seen that the curtain 14 will be reeled on to the sleeve members 41 and 42 when its free end including a handle 66 is released. A message blank 16 lying on the curtain will be curved to cylindrical form and its edges will be held firmly between curtain and the sleeve members 41 and 42. The side rails 28 and 30 are each provided with a groove 68 (Fig. 3) which is enlarged as indicated by reference character 69 (Fig. 8). The inner edge of this enlarged portion of the groove provides a shoulder 71 against which the inner end 74 of a flange 76 of a lateral extension 78 of the handle 66 engages when the handle and the extension 78 are inclined as shown in Fig. 8 of the drawings. This maintains the curtain in the outdrawn position of Figs. 1 and 8 until the handle 66 is rocked to the right as viewed in Fig. 8 of the drawings. When this is done, the flanges 76 ride in the narrower portions of the groove 68 as shown in Fig. 3 of the drawings. A limit is set to the winding of the curtain by engagement of the flanges 76 with the inner end of the groove 68.

The previously mentioned stylus 22 is supported from a carriage indicated generally by reference character 81 which is composed of a sleeve-like member 83 which has three stepped portions as best shown in Fig. 2 of the drawings. The portion of reduced diameter 84 at one end of the sleeve-like member 83 carries a part 88 generally in the form of a disc (Fig. 3). A central aperture 91 clears a lead screw 92. A notch 94 fits over a reduced portion 96 of a stylus carrying sleeve 98 so as to propel the latter along a squared shaft 101 upon which it is slidably mounted. A pair of similar blocks 102 and 103 are each provided with circular recesses 104 and 106 which embrace the enlarged portion 108 of the sleeve member 83. A bow spring 109 engages at each end in a notch 111 in each block 102 and 103 and urges these blocks together. The two parts 114 and 116 of a split internally threaded sleeve are engaged respectively in recesses 104 and 106 in the blocks 102 and 103.

Figure 5:
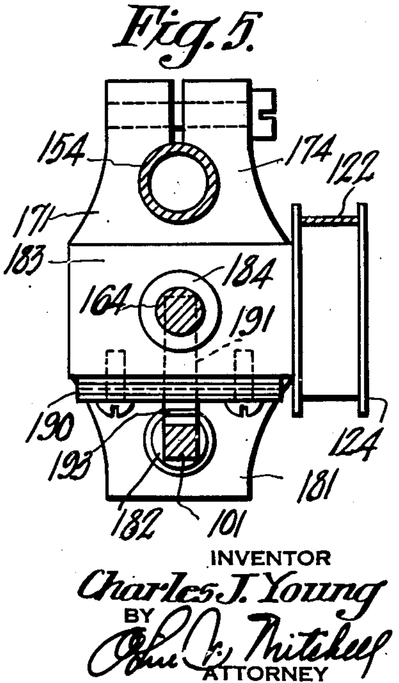
Fig. 5 is a fragmentary vertical sectional view taken on line 5—5 of Fig. 2.

In the position of the parts shown in Fig. 3, the internally threaded parts of the portions 114 and 116 of the split sleeve threadily engage the threads in the lead screw 92 so that as this lead screw is rotated in a manner to be described, the carriage will be propelled. The direction of the drive is such that the carriage progresses toward the right as viewed in Fig. 2 during a scanning operation. In Fig. 2, a scanning operation is just completed. The enlarged end 118 of the sleeve 98 has the configuration shown so that when the shaft 101 is rotated a quarter turn to the position illustrated by Fig. 4 of the drawings, the stylus 22 will be raised from contact with the recording blank 16 and at the same time, the blocks 102 and 103 will be spread to remove the threaded parts 114 and 116 from engagement from the lead screw 92. The carriage 81 can then be returned toward the left as viewed in Fig. 2 of the drawings by means of a flexible strip such as a bronze ribbon 122 which is wound on a spring biased reel 124. This reel is secured upon the previously mentioned bearing bracket 171 as shown in Fig. 5 so that it rotates therewith as the carriage revolves. The carriage anchor for the reel is shown in Fig. 3. The end of the strip 122 is anchored to a bracket 126 which is secured to the disc-like member 88.

The means for imparting rotation to the carriage 81 and the lead screw 92 will now be described. A motor (not shown), which may be conveniently housed beneath the base member 12, has a pinion 131 secured to its armature shaft 132. This pinion 131 is in mesh with a gear 134 which drives a sleeve 136 through a key 138. A pinion 139 is also keyed to the sleeve by means of the key 138. A second pinion 142 is secured to the sleeve by suitable means such as the key 138. The sleeve 136, therefore, is in the form of a gear cluster comprising gear 134 and pinions 139 and 142 which rotate on a spindle 144 secured to the end frame 24. The pinion 139 drives a gear 146 which is fastened to a sleeve 148 by means of a set screw 149 or the like. This sleeve 148 is journalled in the bracket member 48 by means of a ball bearing 152. The enlarged head of the sleeve 148 receives one end of the circular slide shaft 154 upon which the carriage 81 slides. The lower enlarged end of the sleeve 148 carries an insulating bushing 156 within which the shaft 101 is journalled.

The smaller pinion 142 is in mesh with a gear 158 which is secured by means of a pin 161 to the lead screw shaft 164. The shaft 164 is journalled in the sleeve 148 so that it rotates freely therein. The respective diameter of the gear 146 of the pinion 139 together with the gear 158 and the pinion 142 rotates the carriage and the lead screw at differential rates so that with a lead screw of given pitch the carriage moves longitudinally of the shaft 154 at scanning speed. The result of this is that the stylus 22 traces a helix on the blank 16 which is formed to a cylinder.

The previously mentioned bracket 57 has a hub 168 carrying a ball bearing 169 which rotatably supports a bracket 171. This bracket 171 is provided with an upwardly projecting portion 174 (Fig. 5) which holds one end of the circular slide shaft 154 upon which the carriage slides (Fig. 5). The lower end of this bracket 57 has a second radially extending portion 181 which accommodates an insulating bearing sleeve 182 for the squared shaft 101. A forwardly projecting portion 183 (Fig. 2) of the bracket 171 is provided with a bearing sleeve 184 for the lead screw shaft 164.

An insulating sleeve 188 carries a conductive rod 189 which makes contact with a brush spring 191. This brush spring is insulated from but carried by the bracket 174 through an insulating means 190 and a second brush spring 193 connects electrically with the brush spring 191 and is in contact with a rounded portion of the squared shaft 101.

Figure 6:
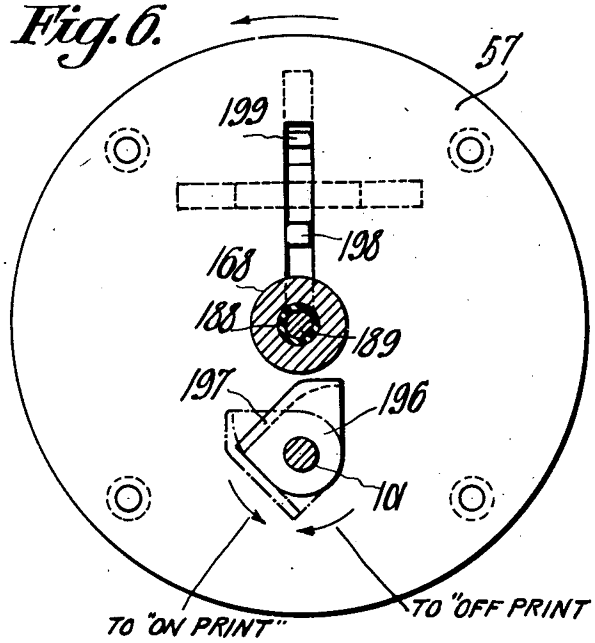
Fig. 6 is a fragmentary vertical sectional view taken on line 6—6 of Fig. 2.

The squared shaft 101 is rocked by means of cam 196 secured thereto which has a configuration best shown in Fig. 6 of the drawings. The cam, as shown in Fig. 2 of the drawings, is in the "off print" position indicated by dot-dash lines on Fig. 6. The carriage is, therefore, ready to be released in Fig. 2 when the magnet is de-energized. A flange 197 on the cam 196 is engageable with a tongue 198 or a tongue 199 on a sector member 202. This sector member can be a small angular member with teeth 203 which mesh with teeth 205 formed at the end of an armature 204. This armature is rocked by a magnet structure 206 having an energizing coil 208. When the magnet is energized, the tongue 198 is in the path of the cam flange 197. This will rock the cam to the "on-print" or dot-dash line position of Fig. 6. When the magnet is de-energized, the armature 204 is raised and the tongue 199 is in the path of the cam flange 197. This will rock the cam to the "off-print" or solid line position of Fig. 6. In the "off-print" position, the parts are in the position shown in Fig. 4 with the half nut parts released and the stylus raised.

The gear 146 which imparts rotation to the carriage 81 has a cam member 228 secured thereon (Figs. 2 and 7) by suitable fastening means such as screws 229. This cam is provided with a cam projection 232 which operates a contact or switch tongue 234 once for each revolution of the carriage. This switch tongue has a contact which normally is in electrical engagement with a contact arm 236, but it is moved out of engagement with the arm 236 and into electrical engagement with a switch arm 238, once for each revolution of the cam. The purpose of this switch is to originate a phasing signal which, in accordance with the invention is to be made available for operation of a transmitter as disclosed and claimed in the copending application Serial No. 57,606. A system including the recorder disclosed herein is disclosed and claimed in the copending application Serial No. 57,605, now Patent Number 2,538,547, granted January 16, 1951.

Operation of the apparatus, the mechanical parts of which have been described, will be described with reference to Fig. 9 of the drawings showing a schematic circuit arrangement. Reference will also be had to Fig. 10 disclosing a blank detector. The curtain 14 of the recorder occupies the position shown in Figs. 1 and 8 of the drawings with the end 74 of the frame 76 in engagement with the groove shoulder 71. A message blank such as the blank 16 shown in Fig. 1 of the drawings, is placed on the curtain which is in a flat position with the hole 18 engaged over the pin or projection 20. It will be noted that the "mast head" portion of the blank is then in such a position that only the recording area 14 of the sheet will be exposed to action of the scanning stylus 22. The handle 66 is rocked or the extension 78 is pressed downwardly which releases the curtain so that it may roll on to the members 41 and 42 taking the blank with it.

Figures 9, 10:
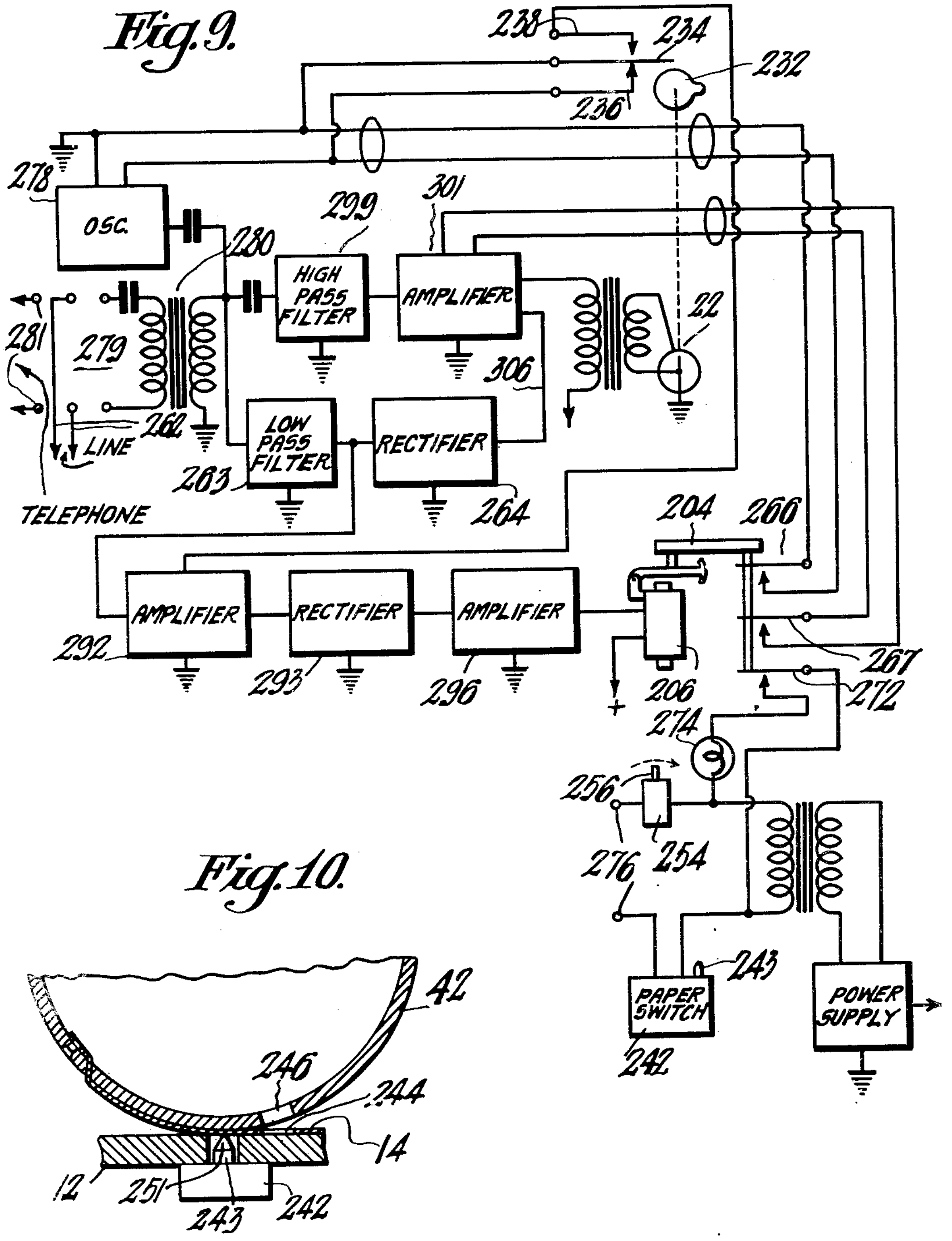
Fig. 9 is a schematic showing of electrical circuits adapted to provide operation of the apparatus of Fig. 1.
Fig. 10 is a fragmentary section taken substantially on line 10—10 of Fig. 1 to show, diagrammatically, the recording blank detector.

A detecting arrangement or a paper switch is shown somewhat schematically on Fig. 10 of the drawings which functions to detect the presence or absence of a blank 16. This paper detecting arrangement comprises a normally open electrical switch 242 having a switch operator 243 which operates through a limited vertical range so that when it is in its upper position the switch 242 is open. A hole 244 is provided in the curtain 14 and a hole 246 is provided in the sleeve member 42 so that if the curtain is rolled on the sleeve member 42 the holes 244 and 246 will be in register. A second hole 248 (Fig. 1) is provided on the curtain which also comes in register with the holes 244 and 246 when the curtain is fully wound on the sleeve 42. If there is no paper on the curtain 14 when the handle 66 is released, the curtain will be wound on the sleeve 42 and the switch operator 243 will project upwardly through the registering holes to open the switch. The limit of travel of the switch operator 243 permits its conical end 251 to serve as a cam to allow the curtain to move without interference. With a blank in position on the curtain the switch 242 will be prevented from opening its circuit so that operation may be had in a manner to be described in Fig. 9.

A manually operable switch 254 is provided having an upwardly projecting handle 256 which appears in Fig. 1 of the drawings. This switch is secured in any suitable manner beneath the base 12 and the handle projects up so that it may be brought forward to the switch closed position when the curtain is advanced toward the sleeves 41 and 42. In this way the machine can be turned on when the curtain is rolled up. When the curtain is unwound, the engagement of the handle 66 with a switch handle 256 will open the switch.

When a tone is received over the line 262 or any equivalent communication link or channel, this tone is selected by low-pass filter 263, is rectified by rectifier 293 and after amplification operates the magnet 206. This magnet has associated with it a series of normally open contacts 266, 267 and 272 which are schematically shown. One of these, 266, serves to disconnect or otherwise disable the output of an oscillator 278. The oscillator 278 is the phasing signal oscillator. The second of these contacts 267 causes a recording amplifier 301 to become operative. The third of these, 272 causes illumination of a pilot light 274 to indicate that recording is in progress. Prior to reception, when power is applied to terminals 276 for example, by a suitable manual switch (not shown), the oscillator 278 is placed in operation and transmits a signal through the line transformer 280 an equivalent coupling device to the line 262. A double-pole switch or key 279 provides for connecting the line 262 to phone terminals 281 for voice communication over the line 262. The switch 254 and the switch 279 may be mechanically coupled by means (not shown). The motor (not shown) for driving the recording apparatus also becomes operative to cause mechanical operation of the recorder apparatus which provides for rotation of the cam 232. For each revolution of the stylus carriage 81, the contacts 234 and 236 are opened which causes the oscillator 278 to transmit carrier pulses at the frequency generated by the oscillator. It will be understood that the oscillator 278 may be of the type which will be set into oscillation by closing the control contacts which involves only a single reversal of contacts.

Appropriate phasing pulses produced by the operation of the cam 232 as described cause the more or less distant transmitter to begin the transmission of facsimile signals as set forth and claimed in applicant's copending application Serial No. 57,606 filed October 30, 1948. This signal is applied through a high-pass filter 299 which selects it for an application to the amplifier 301. As shown schematically in Fig. 9 the amplified signal is applied to the stylus 22. The circuit arrangement for energizing the stylus with the recording signal has already been described in detail. The facsimile signals from the transmitter are applied also to the low-pass filter 263 as previously explained to cause operation of the magnet 206. Energization of this magnet causes engagement of the half nut and moves the stylus on to contact with recording blank through the agency of the previously described cam 196. Energization of the magnet 206 also causes the oscillator 278 to cease functioning as explained above. The amplifier 301 is turned on at contacts 267 so that the recorder will operate. The pilot light 274 is turned on at the contacts 272. The contacts 238 short circuit the amplifier 292 to prevent the oscillator from operating the magnet 206. The tone from the low pass filter 263 is rectified in a rectifier 264 and is applied over a conductor 306 to serve as an automatic gain control for the amplifier 301.

What is claimed is:

1. Facsimile apparatus comprising a carriage having an exploring point, means to receive and retain a message sheet in position for scanning cooperation with said exploring point, a track upon which said carriage is slidable, means for imparting rotary movement to said track and the carriage thereon, means to propel said carriage on said track longitudinally of said message sheet retaining means, and means rotatable with said carriage to release said propelling means.

2. Facsimile apparatus comprising a carriage having an exploring point, means to receive and retain a message sheet in position for scanning cooperation with said exploring point, a track upon which said carriage is slidable, means for imparting rotary movement to said track and the carriage thereon, a rotary lead screw to propel said carriage on said track longitudinally of said message sheet retaining means, means on said carriage to engage said lead screw, and means rotatable with said carriage to release said lead screw engaging means.

3. Facsimile apparatus comprising a carriage having an exploring point, means to receive and retain a message sheet in position for scanning cooperation with said exploring point, a track upon which said carriage is slidable, means for imparting rotary movement to said track and the carriage thereon, a rotary lead screw to propel said carriage on said track longitudinally of said message sheet retaining means, a two-part split nut on said carriage for engaging said lead screw, means on said carriage for pressing the parts of said split nut into engagement with said rotary lead screw to propel the carriage, rockable cam means on said carriage for spreading said split nut means to release said carriage, and biasing means to return said carriage to a pre-scanning position, and means rotatable with said carriage to release said propelling means.

4. The combination of claim 3 having a stylus to provide the exploring point, and stylus holding means on said rockable cam in which said stylus is retained, whereby said stylus is moved into scanning position when said split nut engages said lead screw.

5. Facsimile apparatus having means for holding a message blank in scanning position comprising a rotatable cylindrical member, a curtain secured at one end to said member to be drawn into encircling engagement with said member to hold a message blank in position for a scanning operation, means to detect the presence of the message blank on said flexible member prior to its movement into encircling engagement with said cylindrical member comprising an electric switch having a switch operating member engaging said flexible member, and said flexible member having an aperture therein to receive said switch member, said switch member being held in the desired position of operation by presence of a message blank on said flexible member.

CHARLES J. YOUNG.

REFERENCES CITED

The following references are of record in the file of this patent:

UNITED STATES PATENTS

| Number | Name | Date |
|---|---|---|
| Re. 23,113 | Tandler et al. | May 10, 1949 |
| 1,746,407 | Schroter et al. | Feb. 11, 1930 |

FOREIGN PATENTS

| Number | Country | Date |
|---|---|---|
| 14,622 | Australia | Jan. 8, 1929 |